H. BAKEWELL.
SIDE CAR WIND SHIELD.
APPLICATION FILED FEB. 21, 1916.
1,240,646.
Patented Sept. 18, 1917.
2 SHEETS—SHEET 1.
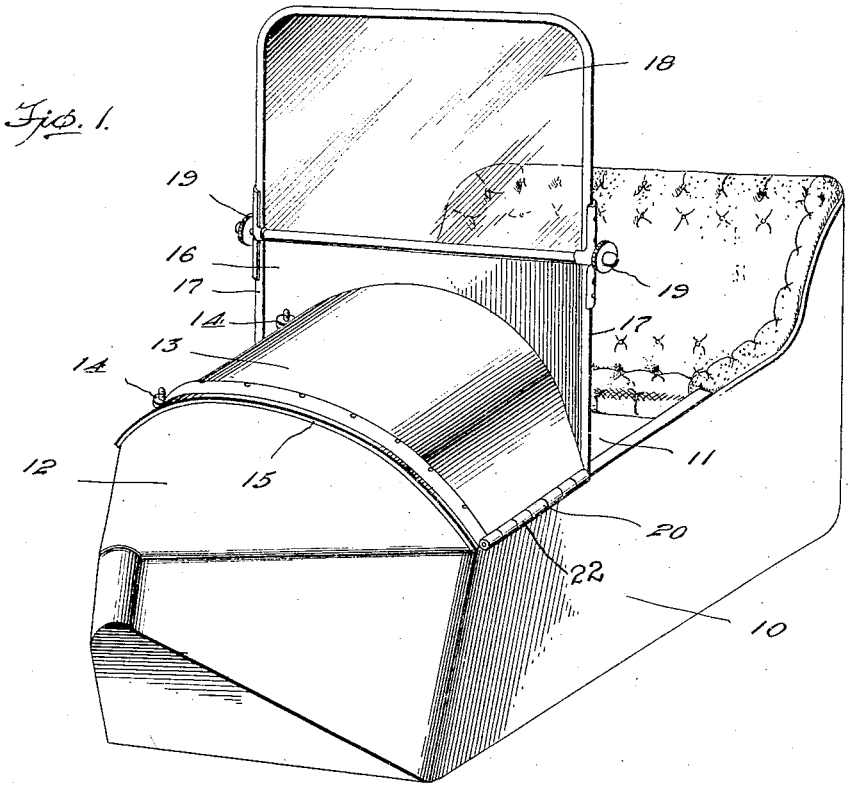
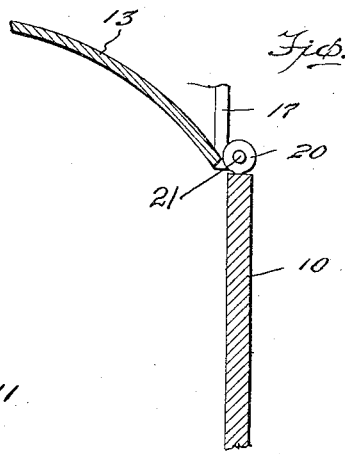
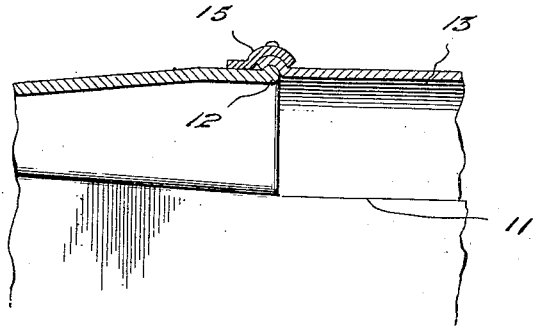
Witnesses
Paul W. Hunt
C. J. Burnett
Inventor
H. Bakewell
By David P. Moore
Attorney

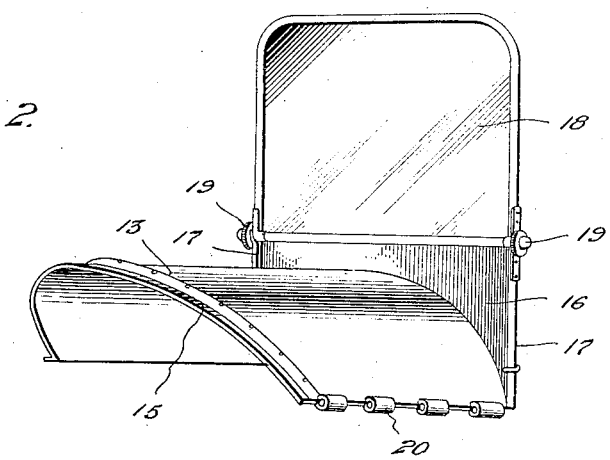
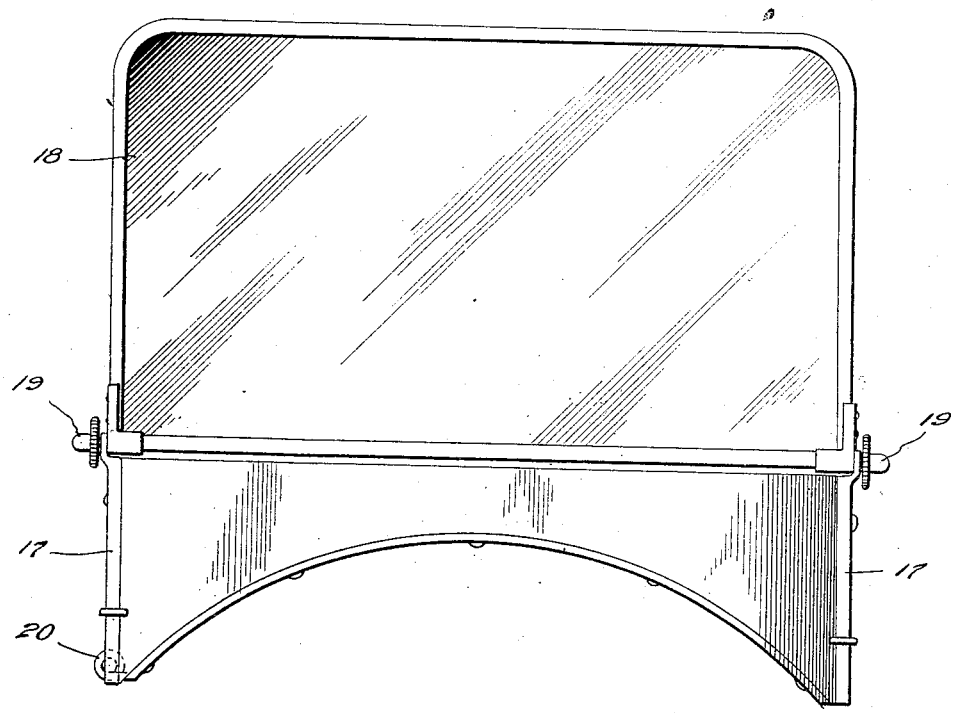

UNITED STATES PATENT OFFICE.

HENRY BAKEWELL, OF LOWELL, MASSACHUSETTS.

SIDE-CAR WIND-SHIELD.

1,240,646.   Specification of Letters Patent.   Patented Sept. 18, 1917.

Application filed February 21, 1916. Serial No. 79,613.

*To all whom it may concern:*

Be it known that I, HENRY BAKEWELL, a citizen of the United States, residing at Lowell, in the county of Middlesex and State of Massachusetts, have invented certain new and useful Improvements in Side-Car Wind-Shields, of which the following is a specification.

This invention relates to improvements in wind shields and more particularly to a wind shield for use upon motor cycle side cars, one object of the invention being the provision of a detachable wind shield that is easily positioned in place to render the riding in side cars more comfortable.

A further object of this invention is the provision of a wind shield of simple, inexpensive and durable construction and which is thoroughly efficient and practical in use.

With the foregoing and other objects in view, and which will appear as the description proceeds, the invention resides in the details of construction and combination and arrangement of parts as hereinafter set forth, the scope of the invention being limited only by what is claimed.

In the accompanying drawings:—

Figure 1 is a perspective view of a motor cycle side car with my improved wind shield and extension hood applied.

Fig. 2 is a perspective view of the shield and extension hood removed.

Fig. 3 is a rear view thereof.

Figs. 4 and 5 are detail views of parts thereof.

Referring to the drawings, the numeral 10 designates the side car, having the open portion 11 to the rear of the hood 12, such open portion being adapted to be closed by the extension hood 13, which closes the same, and provides a closed compartment at the forward end of the car.

Any desired form of fastening devices 14 may be employed to secure the extension hood to the car, the forward edge thereof being provided with the strip 15 for overlaying the rib on the rear edge of the hood 12, to thus insure a tight joint.

Secured to the rear of the extension hood 13, and adapted to be bodily removable therewith, is a supporting board 16, to which is connected the supporting arms or rods 17 of the wind shield 18, which is provided with the locking hinges or pivots 19, by means of which the shield may be adjusted and held at any desired position. As indicated in Fig. 3 the support having the outer edge of the hood section connected to the under surface thereof and in turn having its respective ends resting on the opposite sides of the car body serves as a means to reinforce and brace the extension hood. The shield, as shown consists preferably of a metal frame and a sheet of glass mounted therein, so that the occupant of the side car may enjoy the view while riding.

To removably and pivotally connect the extension hood to one edge of the body of the side car, a plurality of uniformly spaced ears 20 are formed on the side edge and are removably engaged by a pivot 21 which also removably engages ears 22 formed on the adjacent edge of the extension hood. By this means when it is desired to use the extension hood and shield, by removing the pin the attachment can be lifted bodily from its position on the side car. When in use it is only necessary to lift the opposite or free end of the extension hood upwardly to permit of a passenger to enter or leave the car.

With this device the neat outline of the side car is maintained, and the glass shield is brought close to the passenger to offer with the extension hood the greatest possible protection to the passenger.

What I claim, as new, is:—

The combination with a motorcycle side car having a rib formed on the forward edge of the hood and a plurality of ears formed on one side edge adjacent the hood, of an extension hood having a plurality of ears on one edge, a pivot removably engageable with the ears for swingingly connecting the extension hood to the side car, an arcuate strip carried by the extension hood for overlapping the rib on the hood of the side car, a vertically arranged support having the outer edge of the extension hood secured thereto and reinforced thereby, a windshield connected to the upper edge of the support, and means for adjusting the inclination of the windshield with respect to the support.

In testimony whereof I affix my signature.

HENRY BAKEWELL.